US011320041B2

United States Patent
Shirokoshi (10) Patent No.: US 11,320,041 B2
(45) Date of Patent: May 3, 2022

(54) METHOD FOR LUBRICATING STRAIN WAVE GEARING

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 197 days.

(21) Appl. No.: 16/768,985

(22) PCT Filed: Nov. 9, 2018

(86) PCT No.: PCT/JP2018/041707
§ 371 (c)(1),
(2) Date: Jun. 2, 2020

(87) PCT Pub. No.: WO2020/095447
PCT Pub. Date: May 14, 2020

(65) Prior Publication Data
US 2021/0222769 A1 Jul. 22, 2021

(51) Int. Cl.
*F16H 57/04* (2010.01)
*F16H 49/00* (2006.01)

(52) U.S. Cl.
CPC ....... *F16H 57/0464* (2013.01); *F16H 49/001* (2013.01); *F16H 57/0401* (2013.01)

(58) Field of Classification Search
CPC . F16H 57/0464; F16H 49/001; F16H 57/0401
See application file for complete search history.

(56) References Cited

U.S. PATENT DOCUMENTS

| 2014/0080646 A1* | 3/2014 | Goujon | F16D 41/00 474/166 |
| 2018/0080543 A1* | 3/2018 | Kusumoto | F16H 57/0464 |
| 2018/0281177 A1* | 10/2018 | Kusumoto | B25J 9/1025 |

FOREIGN PATENT DOCUMENTS

| JP | H09250609 A | 9/1997 |
| JP | H09291985 A | 11/1997 |

(Continued)

OTHER PUBLICATIONS

International Search Report (PCT/ISA/210) dated Jan. 29, 2019, by the Japanese Patent Office as the International Searching Authority for International Application No. PCT/JP2018/041707.

(Continued)

*Primary Examiner* — Jake Cook
(74) *Attorney, Agent, or Firm* — Buchanan Ingersoll & Rooney PC (57) ABSTRACT

When a strain wave gearing is used in an application for an operation of repeating startup/stopping, an outer-side lubrication portion and an inner-side lubrication portion, which are lubricated using different types of grease, remain in a communicating state without being divided using a seal member or the like. The outer-side lubrication portion is supplied with a much smaller amount of grease than the amount that would be required if used in an application such as a steady operation. Similarly, the inner-side lubrication portion is also supplied with a much smaller amount of grease than the amount that would be required if used in an application such as a steady operation. Essentially, the outer-side lubrication portion and the inner-side lubrication portion can be lubricated appropriately using different types of grease, without the grease becoming mixed.

2 Claims, 5 Drawing Sheets

(56) References Cited

FOREIGN PATENT DOCUMENTS

| | | |
|---|---|---|
| JP | 2008164149 A | 7/2008 |
| JP | 2017096343 A | 6/2017 |
| WO | 2016068215 A1 | 5/2016 |

OTHER PUBLICATIONS

Written Opinion (PCT/ISA/237) dated Jan. 29, 2019, by the Japanese Patent Office as the International Searching Authority for International Application No. PCT/JP2018/041707.

* cited by examiner

METHOD FOR LUBRICATING STRAIN WAVE GEARING

TECHNICAL FIELD

The present invention relates to a strain wave gearing, and particularly relates to a method for lubricating a strain wave gearing that uses different types of grease as a lubricant supplied to an outer-side meshing portion of an externally toothed gear and as a lubricant supplied to an inner-side strain wave generator portion of the externally toothed gear.

BACKGROUND ART

Lubrication portions of a strain wave gearing include an inner-side lubrication portion positioned on an inner side of an externally toothed gear and an outer-side lubrication portion positioned on an outer side of the externally toothed gear. The inner-side lubrication portion is a sliding portion of a wave generator and a sliding portion between an outer peripheral surface of the wave generator and an inner peripheral surface of the externally toothed gear, and the outer-side lubrication portion is a meshing portion between the externally toothed gear and an internally toothed gear. Optimal lubricants differ for the inner-side lubrication portion and the outer-side lubrication portion, and therefore, lubricants having respectively different lubricating properties are preferably supplied. However, the inner-side lubrication portion and the outer-side lubrication portion are positioned near to each other in the inner and outer sides of the externally toothed gear, and the lubricants thereof mix together.

To prevent the lubricants from mixing together, Patent Documents 1 to 3 propose partitioning the inner-side lubrication portion and the outer-side lubrication portion and impeding the lubricants from flowing between the two portions. However, in commonly used strain wave gearings, the same lubricant is often used in both lubrication portions, and there are still problems such as decreased efficiency and wear in meshing portions during high loads.

PRIOR ART LITERATURE

Patent Documents

Patent Document 1: JP 2017-96343 A
Patent Document 2: JP H09-291985 A
Patent Document 3: JP H09-250609 A

SUMMARY OF THE INVENTION

Problems to be Solved by the Invention

In a strain wave gearing, depending on the operating conditions, it could be possible to reduce the amount of lubricant needed to lubricate the inner-side lubrication portion and the outer-side lubrication portion. The inventors, focusing on the relationship between operating conditions and the necessary amount of lubricant, have discovered that even if a partitioned state is not formed between the inner-side lubrication portion and the outer-side lubrication portion using a sealing member, under specific operating conditions, the mixing of grease applied as a coating to or packed into both lubrication portions can be avoided to an extent such that practicality is not hindered.

On the basis of this knowledge, the present invention proposes a method for lubricating a strain wave gearing in which an inner-side lubrication portion and an outer-side lubrication portion can be lubricated by grease such that the mixing of lubricants can be avoided as appropriate in accordance with an operating state.

Means of Solving the Problems

In the method for lubricating a strain wave gearing of the present invention, an inner-side lubrication portion positioned on an inner side of an externally toothed gear and an outer-side lubrication portion positioned on an outer side of an externally toothed gear are each lubricated using grease. The inner-side lubrication portion is a sliding portion of a wave generator and a contact portion between the wave generator and an internal peripheral surface of the externally toothed gear, and the outer-side lubrication portion is a meshing portion between the externally toothed gear and the internally toothed gear. Different types of grease are used as the inner-side lubricant supplied to the inner-side lubrication portion and the outer-side lubricant supplied to the outer-side lubrication portion.

When an operating condition of the strain wave gearing is a steady operation or a quasi-steady operation, a partitioned state is formed in which the inner-side lubrication portion and the outer-side lubrication portion are partitioned so that the inner-side lubricant and the outer-side lubricant do not mix together, a preset first amount of the inner-side lubricant is supplied to the inner-side lubrication portion, and a preset second amount of the outer-side lubricant is supplied to the outer-side lubrication portion. A steady operation is a continuous operation in which rotational speed, rotating direction and load torque are constant, and a quasi-steady operation is a continuous operation in which rotational speed and rotating direction are constant and load torque changes. A partitioned state can be formed by partitioning the inner-side lubrication portion and the outer-side lubrication portion with a sealing member. A partitioned state can also be formed by extending a cylindrical open edge of the externally toothed gear and using this edge as a sealing portion.

Conversely, when the operating condition of the strain wave gearing is an operation of repeating startup/stopping, a partitioned state is not formed, the inner-side lubricant is supplied to the inner-side lubrication portion in an amount less than the first amount, and the outer-side lubricant is supplied to the outer-side lubrication portion in an amount less than the second amount. An operation of repeating startup/stopping is an intermittent operation in which rotational speed, rotating direction, and load torque change.

In this invention, during an operation of repeating startup/stopping, it is preferred that the amount of inner-side lubricant supplied is equal to or less than $\frac{1}{3}$, and preferably is equal to or less than $\frac{1}{5}$, of the first amount needed for steady operation and other cases. It is also preferred that the amount of outer-side lubricant supplied is equal to or less than $\frac{1}{3}$, and preferably is equal to or less than $\frac{1}{5}$, of the second amount needed for steady operation and other cases.

According to the lubrication method of the present invention, when the strain wave gearing is used in an application involving an operation of repeating startup/stopping, a partitioned state is not formed between the inner-side lubrication portion and the outer-side lubrication portion, the inner-side lubrication portion and the outer-side lubrication portion can be lubricated with different types of grease, and at the same time, mixing together of the different types of grease can be avoided to an extent such that there is no practical hindrance. The structure can be simplified and costs can be reduced because a sealing member or another partition mechanism for forming a partitioned state is rendered unnecessary. Friction loss that would be incurred with a sealing mechanism can also be avoided. Particularly, the strain wave gearing is incorporated in a robot, a conveyor, etc., and there are numerous cases in which operation of repeating startup/stopping is performed, and the lubrication method of the present invention is therefore exceedingly useful in terms of practicality.

MODE FOR CARRYING OUT THE INVENTION

Embodiments of the present invention are described below with reference to the drawings. The present invention can be applied not only to a cup-type strain wave gearing, but also similarly to a top-hat-type strain wave gearing and a flat-type strain wave gearing.

Figure 1:
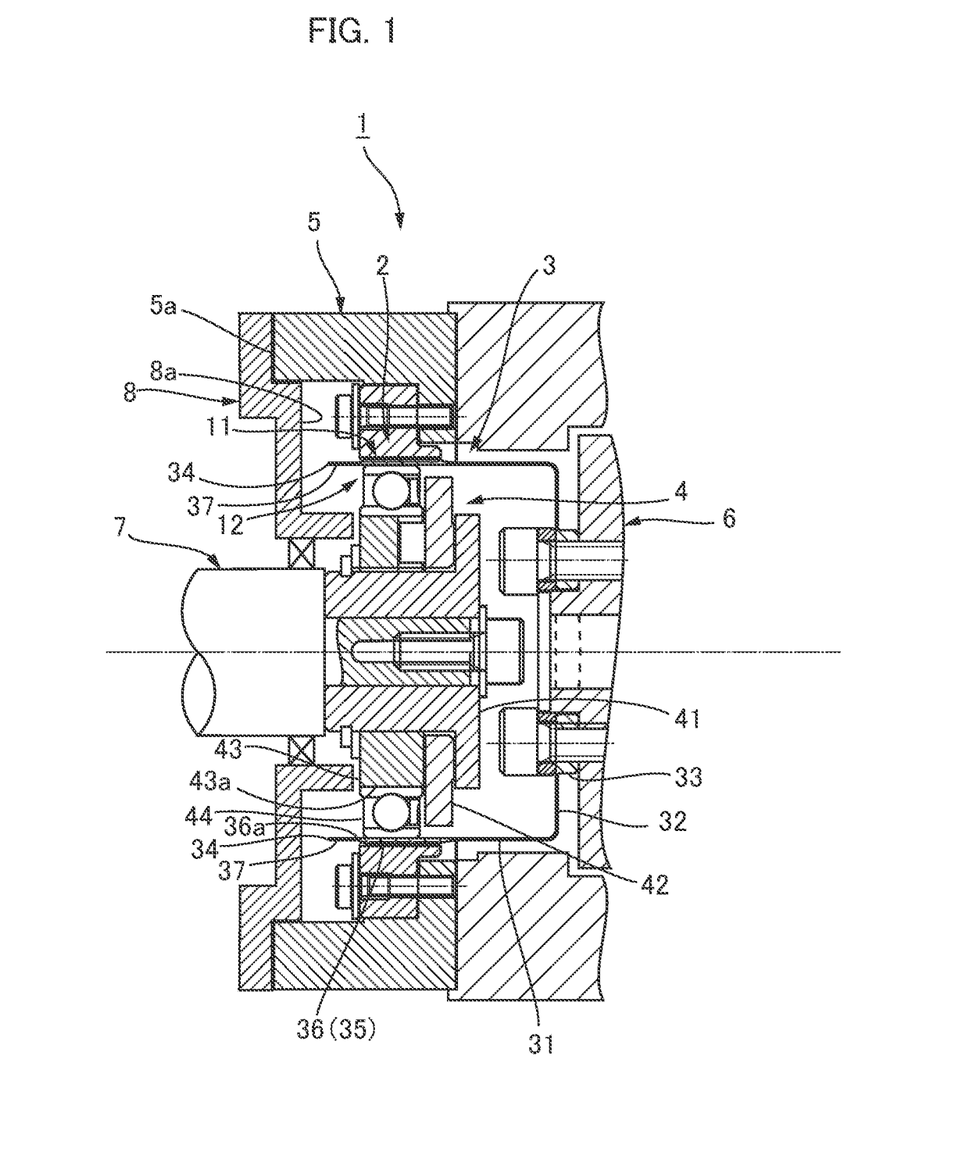
FIG. 1 is a schematic cross-sectional view of a cup-type strain wave gearing to which the lubrication method of the present invention can be applied.

FIG. 1 is a schematic cross-sectional view of a cup-type strain wave gearing according to an embodiment. The strain wave gearing 1 is provided with a rigid internally toothed gear 2 having an annular shape, a flexible externally toothed gear 3 assuming the profile of a cup disposed on the inner side of the internally toothed gear 2, and a wave generator 4 disposed on the inner side of the externally toothed gear 3. The internally toothed gear 2 is coaxially secured to the internal peripheral portion of a cylindrical device housing 5.

The externally toothed gear 3 is provided with a cylindrical barrel part 31, a diaphragm 32 extending radially inward from one end of the cylindrical barrel part 31, and a rigid annular boss 33 formed in continuous fashion on the internal peripheral edge of the diaphragm. The externally toothed gear 3 has an external tooth formation portion 36, on which are formed external teeth 35, formed on the cylindrical barrel part 31, on the side nearer to an open end 34, which is the other end of the cylindrical barrel part 31. In the cylindrical barrel part 31, the area from an end 36a of the external tooth formation portion 36 to the open end 34 constitutes a cylindrical extension portion 37 in which external teeth are not formed. The internally toothed gear 2 is disposed so as to surround the external tooth formation portion 36. The wave generator 4 is disposed on the inner side of the external tooth formation portion 36. A discoid output shaft 6 is coupled and secured to the boss 33 of the externally toothed gear 3.

The wave generator 4 is provided with a cylindrical hub 41, a rigid cam plate 43 coaxially attached to the external peripheral surface of the hub 41 via an Oldham coupling mechanism 42, and a wave bearing 44. The wave bearing 44 is mounted between the internal peripheral surface of the external tooth formation portion 36 of the externally toothed gear 3 and an ellipsoidal external peripheral surface 43a of the rigid cam plate 43. The external tooth formation portion 36 is ellipsoidally flexed by the wave generator 4. The externally toothed gear 3 thereby meshes with the internally toothed gear 2 at both ends of a long axis of an ellipsoid. A rotating motor-shaft or other rotation input shaft 7 is coaxially coupled and secured to the hub 41.

When the wave generator 4 is rotated by the rotation input shaft 7, the meshing positions of both gears 2, 3 move in the circumferential direction, and relative rotation is generated between both gears 2, 3 in correspondence to the difference in the number of teeth between both gears. In the present example, the internally toothed gear 2 is secured, and a reduced rotation is outputted from the externally toothed gear 3 via the output shaft 6.

Secured to an end surface 5a of the device housing 5 is an end plate 8 that partitions the end surface from a motor or another component on the rotation-inputting side. The end plate 8 is provided with an opposing surface 8a that opposes the open end 34 of the externally toothed gear 3, and the space between the inner peripheral surface of the end plate 8 and the rotation input shaft 7 is sealed by a sealing member.

In the strain wave gearing 1, the tooth meshing portion of the teeth of the externally toothed gear 3 and the internally toothed gear 2 positioned on the outer side of the externally toothed gear 3 is an outer-side lubrication portion 11 which is lubricated by a lubricant. The sliding portion of the wave generator 4 positioned on the inner side of the externally toothed gear 3, and the contact portion between the wave generator 4 and the externally toothed gear 3, are the inner-side lubrication portion 12 which is lubricated by a lubricant of a type different from the lubricant supplied to the tooth meshing portion. Different types of lubricant are supplied to the outer-side lubrication portion 11 and the inner-side lubrication portion 12. In the present example, the necessary amount of grease is applied as a coating or packed in beforehand.

The strain wave gearing 1 thus configured is used in robots, conveyors, various automatic machines, and other industrial machinery. The strain wave gearing 1 is used in prescribed operating conditions in accordance with the machinery into which the strain wave gearing 1 is incorporated. The operating conditions of the strain wave gearing 1 can be broadly classified into the following three types.

<Operation of Repeating Startup/Stopping>

Intermittent operation in which rotational speed, rotating direction, and load torque change (robots, conveyors, various automatic machines, and various other commercial applications)

<Steady Operation>

Continuous operation in which rotational speed, rotating direction, and load torque are constant <Quasi-Steady Operation>

Continuous operation in which rotational speed and rotating direction are constant and load torque changes (sheet wind-up machines and other applications)

In accordance with the operating conditions, the necessary lubricants are respectively supplied to the outer-side lubrication portion 11 and the inner-side lubrication portion 12. In the present example, with the necessary amount of grease having been applied as a coating to or packed into the outer-side lubrication portion 11 and the inner-side lubrication portion 12, the strain wave gearing 1 is attached to a machine into which the gearing is to be incorporated.

When the application of the strain wave gearing 1 is the abovementioned operation of repeating startup/stopping, the necessary amounts of the lubricants are less than in the case of the abovementioned steady operation and quasi-steady operation. In other words, in an application in which operation of repeating startup/stopping is performed, every time the rotating direction is switched, the lubrication state of the meshing portions of the strain wave gearing used as a reducer is presumed to change, and durability can be said to be comparable even with less lubricant.

In the present example, when the strain wave gearing 1 is used in an application in which operation of repeating startup/stopping is performed, the amount of grease coating (or the amount of grease packing) in the outer-side lubrication portion 11 is reduced below a first amount, which is the amount of grease coating (or the amount of grease packing) in the outer-side lubrication portion 11 needed in a steady operation or a quasi-steady operation. For example, the amount of grease coating is reduced to no more than about ⅓, or preferably no more than ⅕, of the first amount. Similarly, the amount of grease coating in the inner-side lubrication portion 12 is reduced below a second amount, which is the amount of grease coating in the inner-side lubrication portion 12 needed in (1) a steady operation or (2) a quasi-steady operation. For example, the amount of grease coating is reduced to no more than about ⅓, or preferably no more than ⅕, of the second amount.

Thus, when the strain wave gearing 1 is used in an application in which operation of repeating startup/stopping is performed, the amounts of the lubricants in the outer-side lubrication portion 11 and the inner-side lubrication portion 12 are set to less than in cases in which the gearing is used in applications where other operations are performed. In this state, the strain wave gearing 1 is driven so that operation of repeating startup/stopping is performed. During this action, there is almost no mixing together of the lubricant applied as a coating on or supplied to the outer-side lubrication portion 11 and the lubricant applied as a coating on or supplied to the inner-side lubrication portion 12, and it has been confirmed that there are no problems in terms of practicality. Lubrication shortage and ill effects arising thereof can be avoided by appropriately setting the amount of lubricant applied as a coating or supplied in accordance with the specific application in which operation of repeating startup/stopping is performed. Furthermore, because lesser amounts of the lubricants are needed, there is less of a risk that the lubricants will leak from the strain wave gearing; therefore, additional effects can be achieved in that the sealing structure for preventing leakage can be simplified and friction loss can be reduced.

Figure 2:
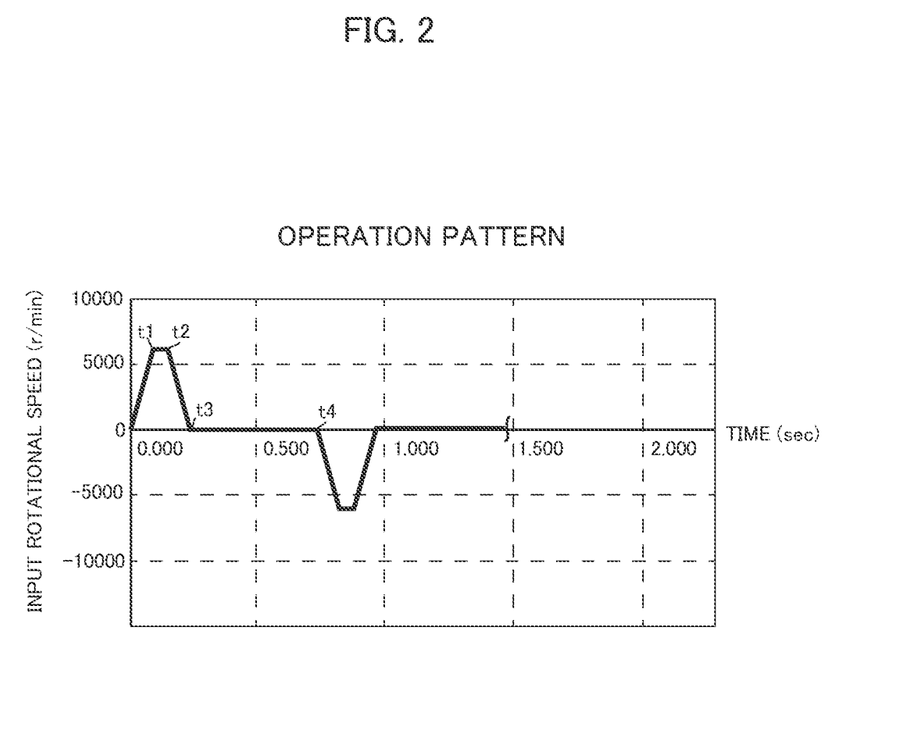
FIG. 2 is a graph of a specific pattern of an operation of repeating startup/stopping.

FIG. 2 is a graph of one example of a specific operation pattern of an operation of repeating startup/stopping in the strain wave gearing 1 used as a reducer. In this graph, the horizontal axis represents time and the vertical axis represents input rotational speed of the strain wave gearing. As shown in this graph, the gearing accelerates to a prescribed rotational speed (e.g., 6000 r/min) within the time from stopping to a time point t1 (e.g., 0.08 sec). The gearing then rotates at the same rotational speed (e.g., 6000 r/min) until a time point t2 (e.g., 0.050 sec). The gearing decelerates from the time point t2 to a time point t3 (e.g., 0.08 sec) and then stops. After a stopping time from the time point t3 to a time point t4 (e.g., 0.531 sec), the gearing then performs the same action in the opposite rotating direction and returns to the starting position. This action is repeated. During acceleration or deceleration, load torque is exerted on a reduced-rotation-outputting component of the strain wave gearing 1 when inertia is driven. The durability and lubricant-separated state of the strain wave gearing 1 with less lubrication in the outer-side lubrication portion 11 and the inner-side lubrication portion 12 have been confirmed by an operation pattern simulating robot operation.

When the strain wave gearing 1 is used in an application of a steady operation or a quasi-steady operation, the lubricants are supplied to the outer-side lubrication portion 11 and the inner-side lubrication portion 12 in amounts employed in a product catalog, product specifications, etc. In this case, there is a risk that the lubricant supplied to the outer-side lubrication portion 11 and the lubricant supplied to the inner-side lubrication portion 12 will mix together. In this case, a partitioned state is preferably formed in which the outer-side lubrication portion 11 and the inner-side lubrication portion 12 are partitioned by a sealing member so that the lubricants do not flow between these two portions.

Figure 3:
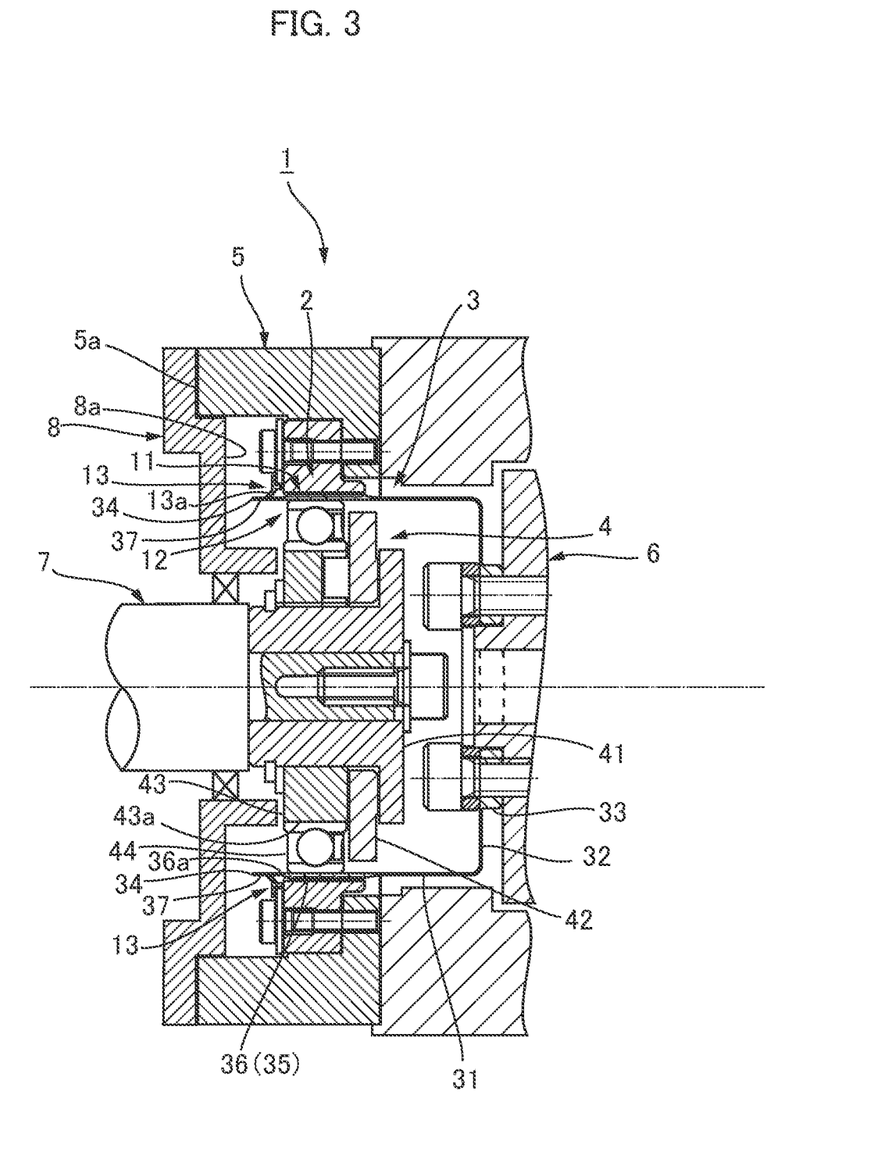
FIG. 3 is a schematic cross-sectional view of a partitioned state for preventing lubricant mixing in the strain wave gearing during steady operation, etc.

FIG. 3 shows a strain wave gearing 1 set in a state in which the outer-side lubrication portion 11 and the inner-side lubrication portion 12 are partitioned. The example illustrated is one example of a partitioned state, and various partitioned states using sealing members can be employed.

As shown in this drawing, the strain wave gearing 1 is provided with a lubricant mixing prevention part for preventing the lubricant supplied to the outer-side lubrication portion 11 and the lubricant supplied to the inner-side lubrication portion 12 from mixing together. The lubricant-mixing-prevention part of the present example is configured from an annular oil seal 13 disposed in a state of contact with the cylindrical extension portion 37 formed in the externally toothed gear 3.

The cylindrical extension portion 37 is a portion from an end 36a in the tooth-trace direction of the external teeth in the external tooth formation portion 36, to the open end 34 of the externally toothed gear 3. The oil seal 13 is secured to a portion on the internal peripheral edge side of the internally toothed gear 2. A seal lip 13a of the oil seal 13 is in contact with the external peripheral surface of the cylindrical extension portion 37. The area between the outer-side lubrication portion 11 and the inner-side lubrication portion 12 is sealed by the oil seal 13. The oil seal 13 is provided with deformability capable of following deformation of the cylindrical extension portion 37 of the externally toothed gear 3, and each portion in the circumferential direction is constantly kept in a state of contact with the cylindrical extension portion 37.

The lubricant supplied to the outer-side lubrication portion 11 is blocked by the oil seal 13 from flowing out to the open end 34 side. The lubricant supplied to the inner-side lubrication portion 12 passes through a gap portion between the cylindrical extension portion 37 and the end plate 8 and flows out to the external peripheral side of the externally toothed gear 3. Outflow to the external peripheral side of the externally toothed gear 3 is suppressed by the cylindrical extension portion 37. Lubricant that has flowed out to the external peripheral side is blocked by the oil seal 13 from flowing into the outer-side lubrication portion 11. The two lubricants can be reliably prevented from mixing together, and both the outer-side lubrication portion 11 and the inner-side lubrication portion 12 can be kept in an appropriately lubricated state.

Figure 4:
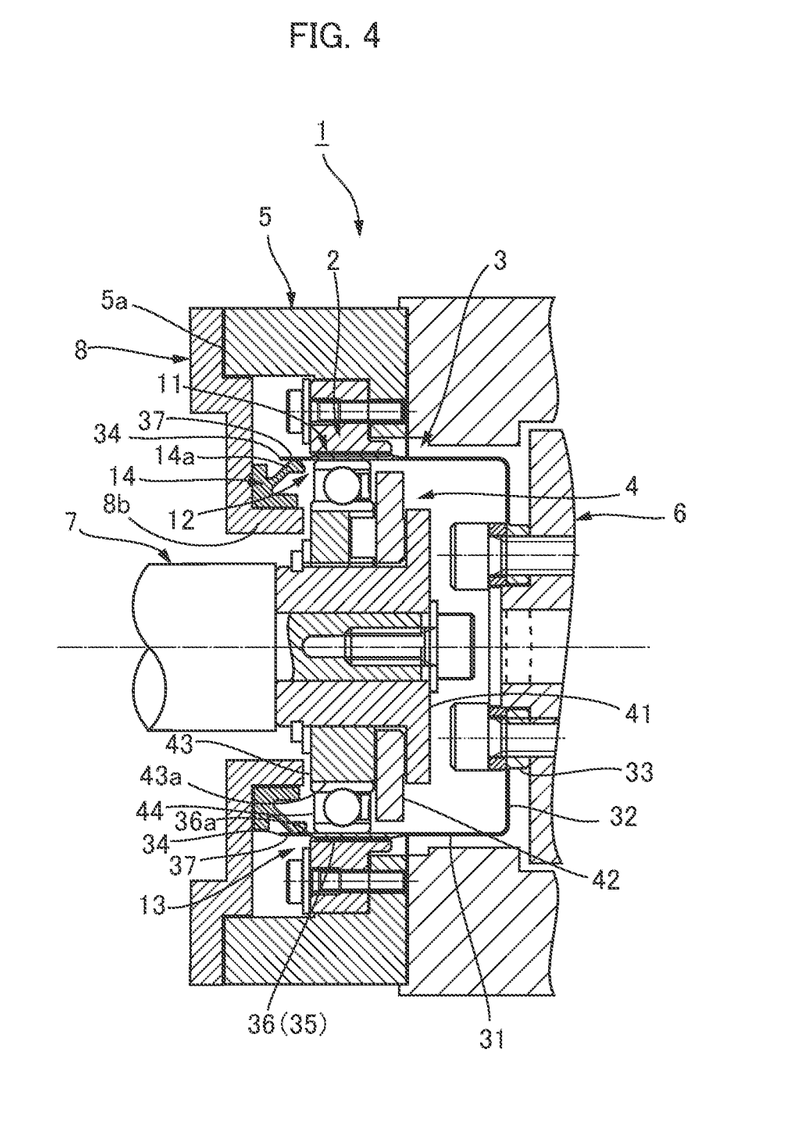
FIG. 4 is a schematic cross-sectional view of one example of the partitioned state of the strain wave gearing.

Here, the oil seal can be disposed on the inner-side lubrication portion 12 side. FIG. 4 is a schematic half-sectional view showing an example of a lubricant-mixing-prevention part having this configuration. An annular oil seal 14 is secured to the external peripheral surface of a cylindrical part 8b formed in the internal-peripheral-edge portion of the end plate 8. A seal lip 14a of the oil seal 14 is in contact with the internal peripheral surface of the cylindrical extension portion 37 of the externally toothed gear 3. In this case as well, the oil seal 14 is provided with deformability capable of following deformation of the cylindrical extension portion 37 of the externally toothed gear 3, and each portion in the circumferential direction is constantly kept in a state of contact with the internal peripheral surface of the cylindrical extension portion 37.

Figure 5A:
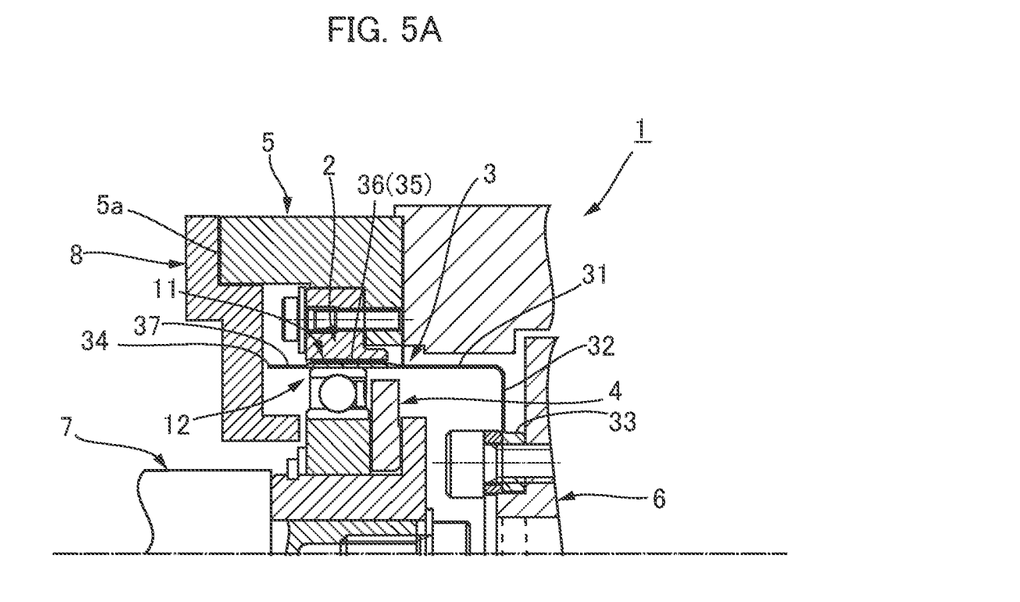
FIG. 5A is a schematic half-sectional view of one example of the partitioned state of the strain wave gearing.

There are also cases in which the oil seals 13, 14 can be omitted. FIG. 5A is a schematic half-sectional view of one example of forming a partitioned state that does not use an oil seal. In this case, the length of the cylindrical extension portion 37 is appropriately set, and the dimension of the gap between the open end 34 and the end plate 8 is appropriately set. Mixing of lubricants can thereby be suppressed to a level that does not hinder practical use. Mixing together of the two lubricants can be substantially prevented by an exceedingly simple partitioning mechanism for preventing lubricant mixing.

Figure 5B:
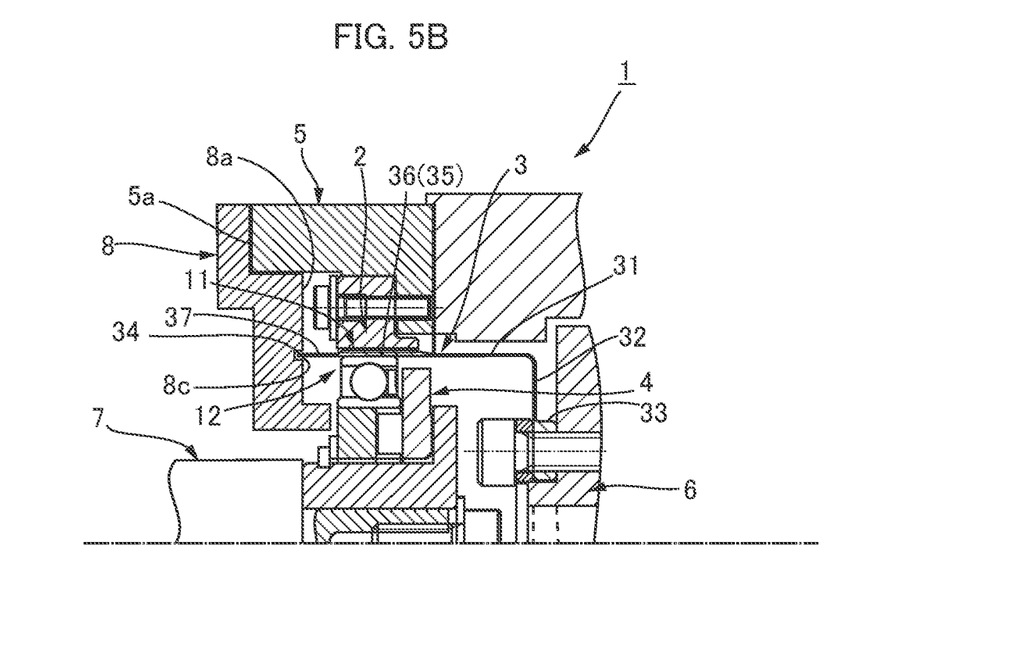
FIG. 5B is a schematic half-sectional view of one example of the partitioned state of the strain wave gearing.

FIG. 5B is a schematic half-sectional view of one example of using a labyrinth seal as the partitioning mechanism. A groove 8c having an annular rectangular cross section is formed in the opposing surface 8a of the end plate 8 which opposes the open end 34 of the cylindrical extension portion 37 of the externally toothed gear 3. A state is formed in which a portion of the open end 34 of the cylindrical extension portion 37 is inserted into the groove 8c. The width of the groove 8c is set to a dimension in which there is no interference with the portion of the open end 34 even if the portion deforms. A labyrinth seal is formed between the internal peripheral surface of the groove 8c and the external peripheral surface portion of the portion of the open end 34 of the cylindrical extension portion 37. Mixing together of the two lubricants can be reliably prevented by a mechanism for preventing lubricant mixing, which is configured from the cylindrical extension portion 37 and the labyrinth seal.

The invention claimed is:

1. A method for lubricating a strain wave gearing, in which the strain wave gearing comprises: a rigid internally toothed gear; a flexible externally toothed gear coaxially disposed inside the internally toothed gear; and a wave generator that is coaxially disposed inside the externally toothed gear and makes the externally toothed gear to flex into an non-circular shape and partially mesh with the internally toothed gear, the method comprising:

grease lubrication is applied to an inner-side lubrication portion positioned on an inner side of the externally toothed gear and an outer-side lubrication portion positioned on an outer side of the externally toothed gear, the inner-side lubrication portion being a sliding portion of the wave generator and a contact portion between the wave generator and an internal peripheral surface of the externally toothed gear, and the outer-side lubrication portion being a meshing portion between the externally toothed gear and the internally toothed gear;

different types of grease are used as an inner-side lubricant supplied to the inner-side lubrication portion and an outer-side lubricant supplied to the outer-side lubrication portion;

when the strain wave gearing is used in an application for performing a steady operation or a quasi-steady operation, the steady operation being a continuous operation in which rotational speed, rotating direction and load torque are constant, and the quasi-steady operation being a continuous operation in which rotational speed and rotating direction are constant and load torque changes, a partitioned state is formed in which the inner-side lubrication portion and the outer-side lubrication portion are partitioned so that the inner-side lubricant and the outer-side lubricant do not mix together, a preset first amount of the inner-side lubricant is supplied to the inner-side lubrication portion, and a preset second amount of the outer-side lubricant is supplied to the outer-side lubrication portion; and when the strain wave gearing is used in an application for performing a repeating startup/stopping operation, the repeating startup/stopping operation being an intermittent operation in which rotational speed, rotating direction, and load torque change, the partitioned state is not formed, the inner-side lubricant is supplied to the inner-side lubrication portion in an amount less than the first amount, and the outer-side lubricant is supplied to the outer-side lubrication portion in an amount less than the second amount.

2. The method for lubricating the strain wave gearing according to claim 1, in which during the repeating startup/stopping operation, the amount of the inner-side lubricant supplied is equal to or less than ⅓ of the first amount, and the amount of outer-side lubricant supplied is equal to or less than ⅓ of the second amount.

\* \* \* \* \*